US005872610A

United States Patent [19]
Kobayashi

[11] Patent Number: 5,872,610
[45] Date of Patent: Feb. 16, 1999

[54] LIQUID-CRYSTAL DISPLAY PANEL AND METHOD FOR INSPECTING THE SAME

[75] Inventor: Yoshifumi Kobayashi, Suwa, Japan

[73] Assignee: Seiko Epson Corporation, Tokyo, Japan

[21] Appl. No.: 942,205

[22] Filed: Oct. 1, 1997

[30] Foreign Application Priority Data

Oct. 4, 1996 [JP] Japan .................................. 8-264947
Sep. 11, 1997 [JP] Japan .................................. 9-247110

[51] Int. Cl.$^6$ ...................... G02F 1/1343; G02F 1/1333; G02F 1/13; G01R 31/00
[52] U.S. Cl. ........................... 349/139; 349/54; 349/192; 324/770
[58] Field of Search .................... 349/139, 192, 349/54; 324/770

[56] References Cited

U.S. PATENT DOCUMENTS

| | | | |
|---|---|---|---|
| 5,473,261 | 12/1995 | Marumoto et al. | 349/54 |
| 5,621,554 | 4/1997 | Kuniyori | 349/139 |
| 5,636,044 | 6/1997 | Yuan et al. | 349/139 |
| 5,684,546 | 11/1997 | Kim | 349/139 |
| 5,729,309 | 3/1998 | Na et al. | 349/192 |

FOREIGN PATENT DOCUMENTS

| | | |
|---|---|---|
| 61-194481 | 8/1986 | Japan . |
| 5-10999 | 1/1993 | Japan . |
| 6-167419 | 6/1994 | Japan . |
| 6-214201 | 8/1994 | Japan . |
| 9-127470 | 5/1997 | Japan . |

Primary Examiner—Anita Pellman Gross
Assistant Examiner—Tarifur R. Chowdhury
Attorney, Agent, or Firm—Oliff & Berridge, PLC

[57] ABSTRACT

A liquid-crystal display panel having different-pitch transparent electrodes to be inspected, a first inspection region defined for stripe electrodes on a transparent substrate included in the liquid-crystal display panel, and a second inspection region defined for other electrodes, allows for the use of multi-purpose inspection probes arranged at regular intervals to inspect all the electrodes without difficulty. The first inspection region includes a plurality of stripe electrodes arranged at regular first inspection interval, a plurality of stripe electrodes arranged at intervals different from the first interval, with the stripe electrodes connected to first inspection electrodes included in the second inspection region. When the first inspection electrodes are located in the second inspection region, their spacing is arranged at a second inspection interval characteristic of the second inspection region so they can be inspected with inspection probes spaced at the second inspection interval.

9 Claims, 6 Drawing Sheets

LIQUID-CRYSTAL DISPLAY PANEL AND METHOD FOR INSPECTING THE SAME

BACKGROUND OF THE INVENTION

1. Field of Invention

The present invention relates to a liquid-crystal display panel having liquid crystal encapsulated between a pair of transparent substrates, the transparent substrates having a plurality of electrodes formed thereon, and a method for inspecting the substrate electrodes for short-circuiting.

2. Description of Related Art

Generally, a liquid crystal panel is produced by bonding a pair of transparent substrates with a sealing agent so that a gap is formed, and encapsulating liquid crystal in the gap. A liquid-crystal display panel is produced when auxiliary units are included, such as an integrated circuit (IC) for driving the liquid crystal, a backlight and a casing.

In the liquid-crystal display panel, transparent electrodes for applying voltages to the liquid crystal are formed on the respective transparent substrates. The transparent electrodes are formed in a predetermined layout, taking the form of a stripe, or in a special pattern, for example, a numeral, a character, or a particular design. Since the transparent electrodes are formed in extremely fine dimensions, there is a possibility that they will touch each other to cause short-circuit defects. Accordingly, when producing a liquid-crystal display panel, it is necessary to perform a pre-production phase inspection to ascertain whether or not short-circuits are present among a plurality of transparent electrodes.

For such electrode inspection there is a conventional method in which two inspection probes, arranged at a predetermined interval, are brought into contact with each transparent electrode. Whether or not adjacent transparent electrodes are short-circuited is determined based on whether or not both inspection probes conduct. Ordinarily, the inspection is performed by putting the two inspection probes on two adjacent transparent electrodes, respectively. This type of inspection method is disclosed in, for example, Japanese Unexamined Patent Publication No. 61-194484 where an inspection method for finding short-circuiting is performed by bringing inspection probes in contact with inspection patterns arranged at regular intervals.

However, conventional inspection methods are premised in that all inspection patterns are arranged to correspond to a preset interval of the inspection probes, without consideration for a case in which the intervals of the inspection patterns change. Thus, when the intervals of the inspection patterns change, the interval of the inspection probes must be adjusted each time in accordance with the change. However, it is not preferable to adjust the interval of the inspection probes each time because these adjustments remarkably decreases the productivity of liquid-crystal display panels. While the inspection probes can be arranged in a special form in accordance with the inspection patterns on a transparent substrate to be inspected, application will be limited to a predetermined inspection pattern, and cannot be applied to other electrode patterns, resulting in remarkably low usability for general inspection purposes.

In addition, inspection methods with inspection probes includes a method in which a plurality of transparent electrodes to be inspected are scanned by two inspection probes arranged at a predetermined interval. This method can be executed without difficulty when all the inspection patterns are arranged at intervals (inspection intervals) corresponding to the predetermined interval of the inspection probes. However, if there are inspection patterns arranged at intervals different from the inspection intervals in a region (inspection region) which is scanned by the inspection probes, the two probes cannot be simultaneously brought in contact with the inspection patterns. Thus, the inspection patterns cannot be inspected.

In order to overcome the above problems, it is an object of the present invention to provide a liquid-crystal display panel and method for inspecting the same in which, even if the electrodes to be inspected are formed on a transparent substrate and include different-interval electrodes, all the electrodes can be inspected without difficulty by using multi-purpose inspection probes arranged at regular intervals.

SUMMARY OF THE INVENTION

In order to achieve the foregoing objective, there is provided a liquid-crystal display panel having first and second transparent substrates oppositely arranged, a sealing agent for defining a liquid-crystal-encapsulated region in the gap between the first and second transparent substrates, and liquid crystal encapsulated in the liquid-crystal-encapsulated region. Additionally, one of the first and second transparent substrates includes a plurality of first electrodes arranged in parallel at first inspection intervals, and a first inspection region formed to intersect the first electrodes. A plurality of second electrodes are arranged in parallel to the first electrodes at intervals different from the first inspection intervals. A plurality of first inspection electrodes are formed extending from the plurality of respective second electrodes, the plurality of first inspection electrodes formed in parallel at the inspection intervals of the inspection region to which the first inspection electrodes belong.

According to the present invention, the first and second electrodes are formed at different intervals. In this manner, inspection probes arranged at an interval corresponding to the first inspection interval can inspect the first electrodes for short-circuiting but cannot directly inspect the second electrodes. Accordingly, in the present invention, the first inspection electrodes extending from the second electrodes are arranged at the inspection intervals of the inspection region to which the first electrodes belong. Therefore, even if short-circuiting cannot be found by using the inspection probes, with the second-electrode interval unchanged, by directly bringing the inspection probes arranged at the interval corresponding to the interval of the first inspection electrodes in contact with the first inspection electrodes, the second electrodes can be inspected for short-circuiting. Accordingly, by only adjusting the interval of the inspection probes to the interval of the electrodes to be inspected, and putting the respective inspection probes on the respective electrodes to be inspected, all the first and second electrodes can be inspected for short-circuiting, base on whether or not the adjacent inspection probes are in conduction.

According to the present invention, the first electrodes and the second electrodes are, for example, liquid-crystal driving electrodes formed in the liquid-crystal-encapsulated region.

According to a preferred embodiment of the present invention, the liquid-crystal display panel also has a plurality of parallel third electrodes each spaced apart by second inspection intervals, situated outside the liquid-crystal-encapsulated region, and a second inspection region is formed to intersect the plurality of third electrodes. Additionally, the first inspection electrodes are spaced apart at the second inspection interval, and are parallel to the plurality of third electrodes in the second inspection region. This results in a structure that can simultaneously inspect the second electrodes for short-circuiting when the third electrodes are inspected for short-circuiting in the second inspection region. Hence, it is not necessary to provide an inspection region for the second electrodes on the transparent substrate to inspect only the second electrodes.

According to the present invention, the second electrodes and the first inspection electrodes are electrically connected by an interconnection pattern formed on a peripheral portion of the substrate at intervals narrower than the intervals used for forming the second electrodes, with a line width narrower than that of the second electrode. Such an interconnection pattern does not contribute to a display operation after the production of liquid-crystal display panel is completed. Therefore, by forming on the peripheral portion of the substrate the interconnection pattern at the narrower intervals, with the narrower line width, the region occupied by the interconnection pattern can be reduced as much as possible, and the formation of electrodes and so forth contributing to the display operation cannot be hindered.

In the above manner, when the area occupied by the interconnection pattern for electrically connecting the second electrodes and the first inspection electrodes is reduced, a region for forming the sealing agent can be reserved on a peripheral portion of the interconnection pattern. Accordingly, a sealing agent may be used having conductive particles, resulting in the electrical connection of the electrodes formed on the first transparent substrate and the electrodes formed on the second transparent substrate. In other words, when a sealing agent including conductive particles is used, it is preferable not to form the above interconnection pattern on a region in which the sealing agent is formed so that unnecessary electrical connection between the first transparent substrate and the second transparent substrate can be avoided. According to the present invention, since the area occupied by the interconnection pattern is reduced, the region for forming the interconnection pattern is avoided, and the region for forming the sealing agent can be reserved on an outer portion of the substrate. By forming the sealing agent on the region, the interconnection pattern does not need to be formed on the region for forming the sealing agent, or the interconnection pattern passing through the region for forming the sealing agent can be limited to its necessary minimum.

According to the present invention, a plurality of fourth electrodes may be formed outside the first inspection region within the liquid-crystal-encapsulated region. In this case it is preferable to form second inspection electrodes having second inspection intervals, extending from the plurality of respective fourth electrodes, and parallel to the third electrodes within the second inspection region. This arrangement permits simultaneous inspection of the fourth electrodes for short-circuiting when the third electrodes are inspected for short-circuiting in the second inspection region. Thus, an inspection region for the fourth electrodes does not need to be formed on the transparent substrate for inspection of only the fourth electrodes.

According to the present invention, the first inspection electrodes may be formed in parallel to the first electrodes in the first inspection region at the first inspection intervals. This arrangement can simultaneously inspect the second electrodes when the first electrodes are inspected for short-circuiting in the first inspection region. Therefore, an inspection region for the second electrodes does not need to be formed on the transparent substrate, for inspection of only the second electrodes.

According to the present invention, the inspection interval corresponds to each interval of a plurality of sets of inspection probes for touching each pair of adjacent electrodes among the electrodes to be inspected, resulting in the inspection of a pair of adjacent electrodes for conduction.

In other words, according to the present invention, the "inspection region" corresponds to a scanning movement region obtained by moving two inspection probes to scan the plurality of electrodes to be inspected. When an inspection apparatus in which a number of inspection probes are arranged at regular intervals is used, a region where the inspection probes are arranged corresponds to the inspection region. Also, in the present invention, the "inspection interval" corresponds to the spacing of two inspection probes when they are used. In addition, when a number of inspection probes are used, the inspection interval corresponds to each interval of the respective probes. The plurality of inspection probes may be obliquely arranged, and in this case the "inspection interval" corresponds to the amount of inspection-probe shifting in the direction perpendicularly intersecting the electrodes.

Thus, the structured liquid-crystal display panel can be inspected by moving the inspection probes relative to the region to be inspected on the transparent substrate, the inspection probes scanning the respective electrodes to be inspected so as to intersect the electrodes to be inspected. As a result, the inspection probes sequentially touch each pair of adjacent electrodes among the electrodes under inspection. Thus, by observing whether or not the adjacent inspection probes are in conduction during the above period, the electrodes to be inspected can be inspected for short-circuiting, and the inspection can be easily automated.

DETAILED DESCRIPTION OF PREFERRED EMBODIMENTS

Figure 1:
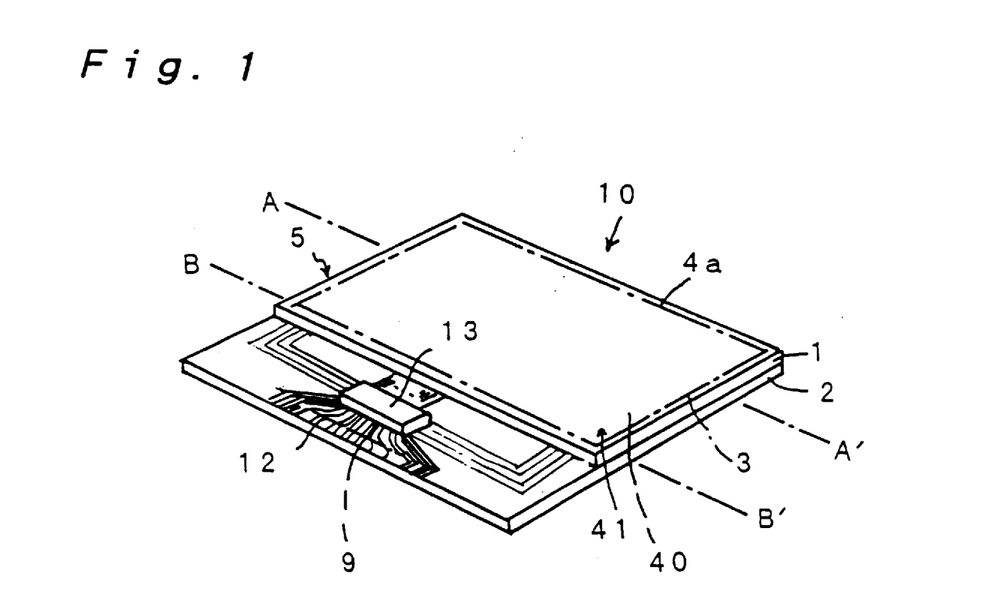
FIG. 1 is a perspective view of a liquid-crystal display panel of the present invention.
Figure 2:
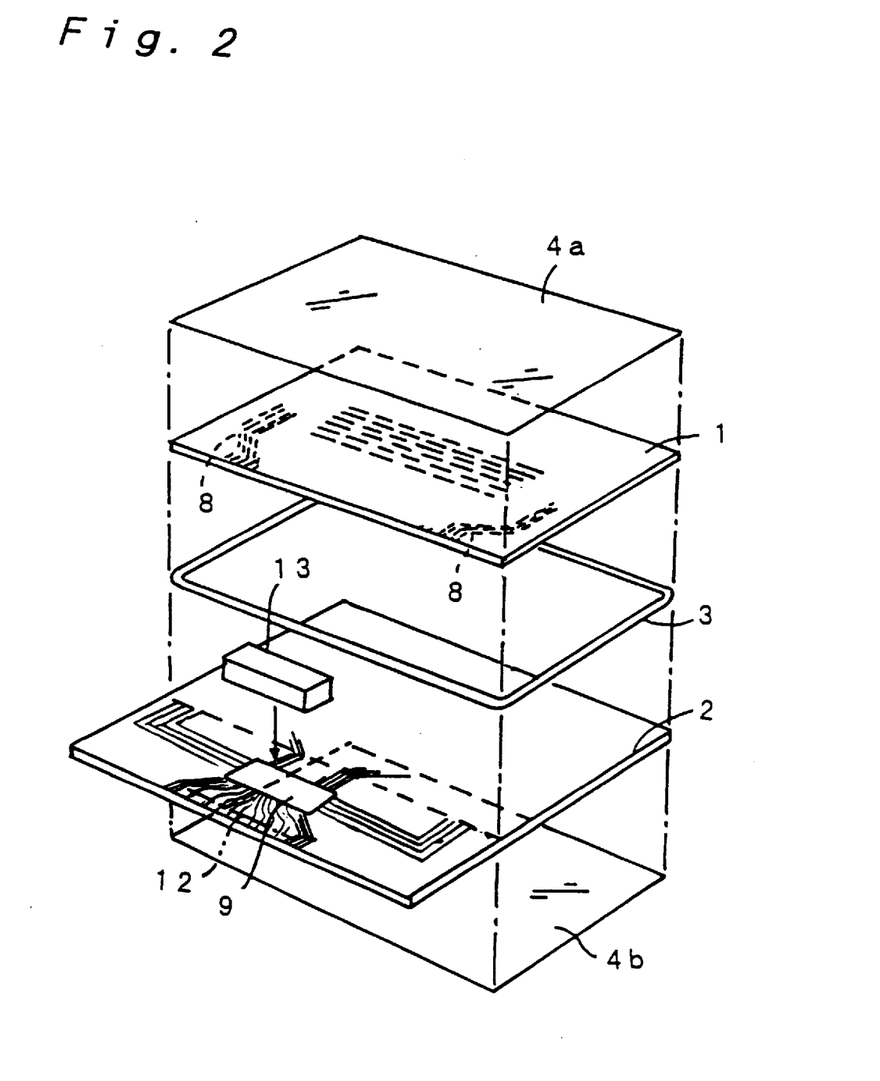
FIG. 2 is an exploded perspective view of the liquid-crystal display panel depicted in FIG. 1.

FIG. 1 is a perspective view showing the exterior of a liquid-crystal display panel 10 according to the present invention. FIG. 2 is an exploded perspective view of the liquid-crystal display panel 10.

In FIGS. 1–2, a liquid-crystal display panel 10 has a first transparent substrate 1 composed of transparent glass and a second transparent substrate 2 composed of similar transparent glass. A sealing agent 3 is formed on either substrate 1 or 2 by printing or the like, and the first transparent substrate 1 and the second transparent substrate 2 are bonded with the sealing agent 3 provided there between. A liquid-crystal-encapsulated region 40 is defined by the sealing agent 3 in the gap (cell gap) formed between the first transparent substrate 1 and the second transparent substrate 2, and liquid-crystal 41 is introduced and encapsulated in the cell gap.

A polarizer 4a is affixed to the external surface of the first transparent substrate 1 with an adhesive or the like. In addition, a polarizer 4b is affixed to the external surface of the second transparent substrate 2 with an adhesive or the like. In this context, "being affixed" does not mean "being firmly bonded so as not to be removed", but means "being affixed so as to be easily removed with relatively weak force".

When the second transparent substrate 2 is larger than the first transparent substrate 1, a portion of the second transparent substrate 2 extends from the lower-end edge of the first transparent substrate 1, with the second transparent substrate 2 being overlaid with the first transparent substrate 1. On the extension portion there is formed an integrated circuit (IC) mounting position 9, to which a liquid-crystal driving IC 13 is bonded. This bonding is performed by providing, for example, an anisotropic conductive film (ACF) between the substrate 2 and the liquid-crystal driving IC 13, heating and pressing the IC 13 to the heated ACF for fixation. Input terminals 12 are formed on the lower-end side of the second transparent substrate 2, and a flexible interconnection board is connected to the input terminals 12.

Figure 3:
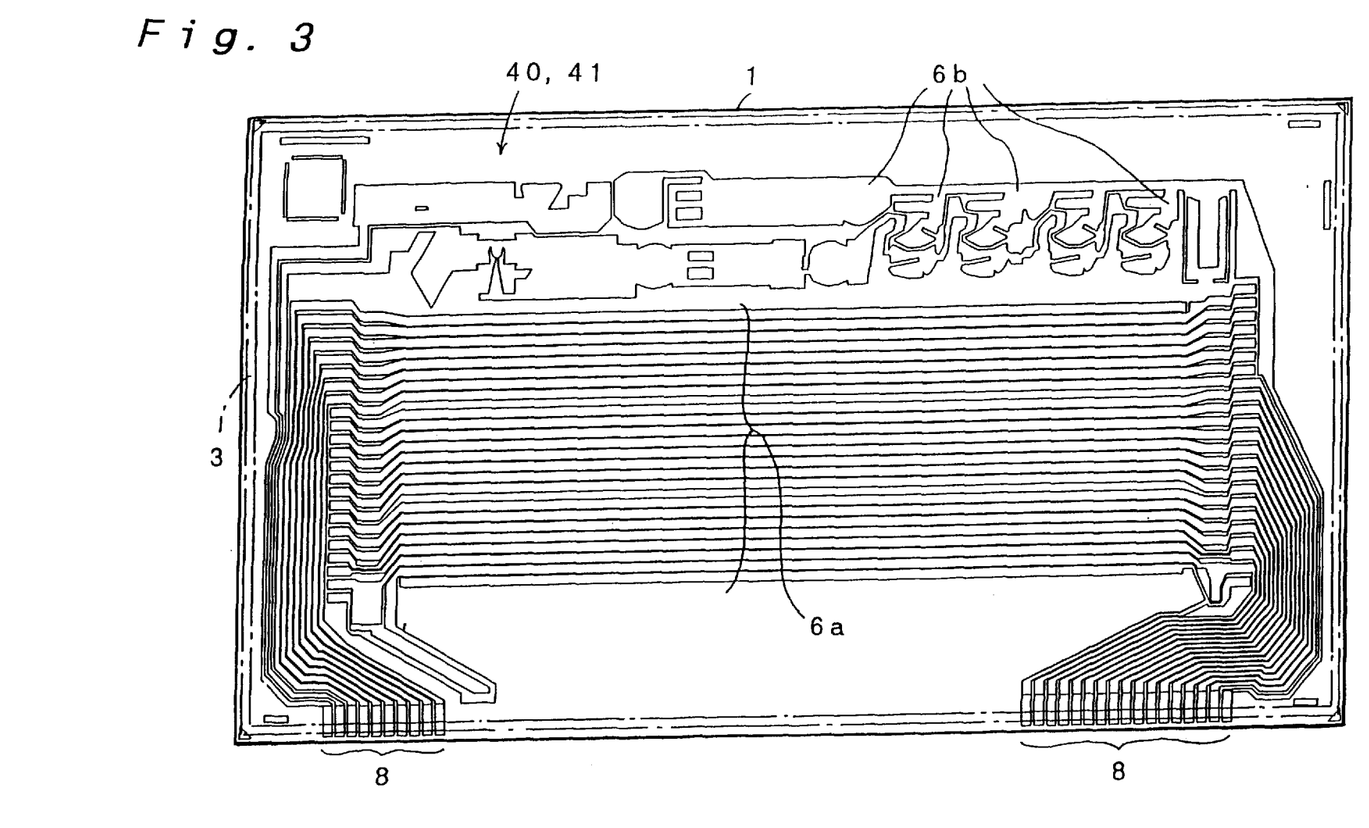
FIG. 3 is a plan view of the arrangement pattern of transparent electrodes on one transparent substrate included in the liquid-crystal display panel shown in FIG. 1.
Figure 4:
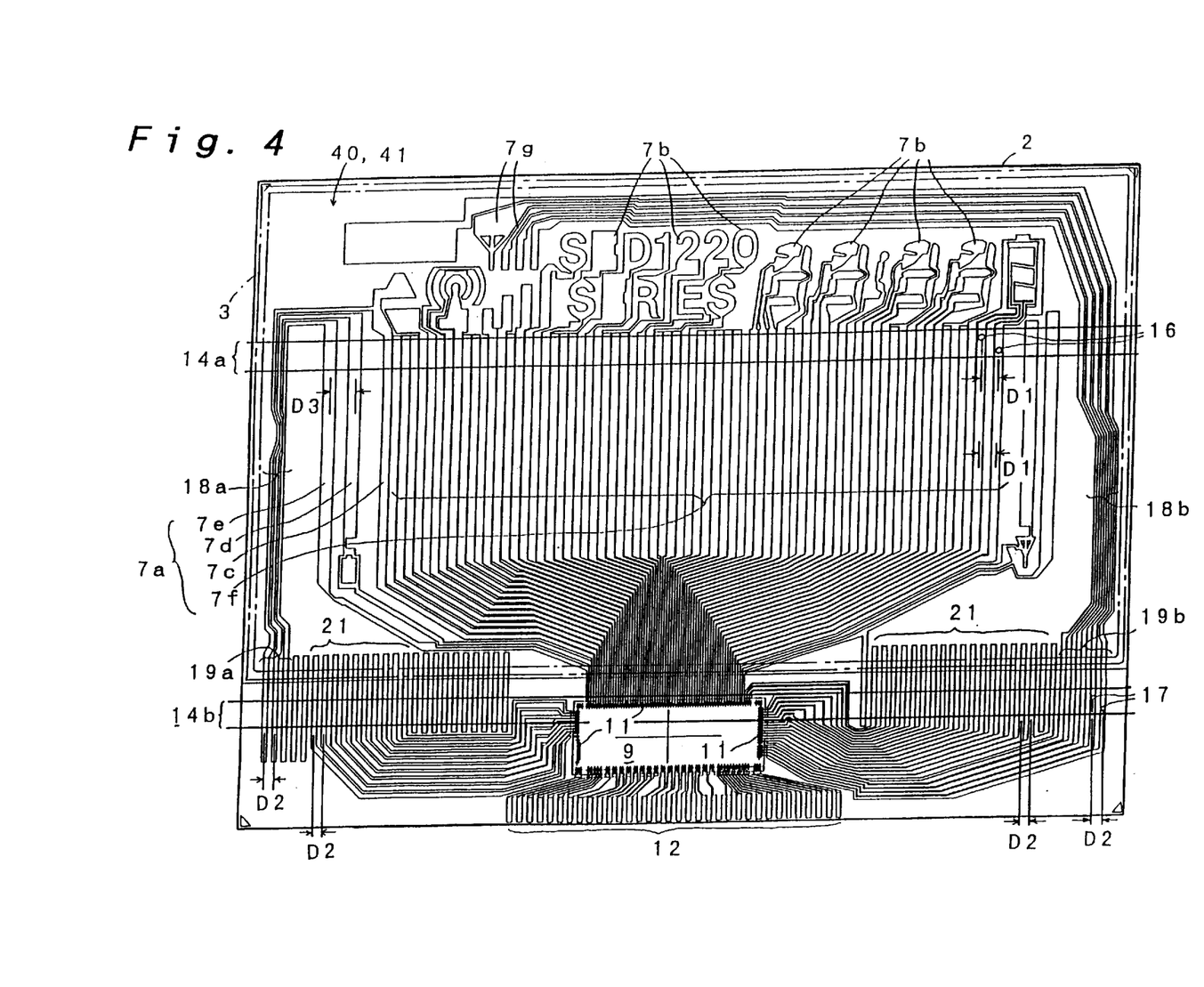
FIG. 4 is a plan view of the arrangement pattern of transparent electrodes on another transparent substrate included in the liquid-crystal display panel shown in FIG. 1.

FIG. 3 and FIG. 4 are plan views showing the arrangement patterns of the transparent electrodes formed on the first transparent substrate 1 and the second transparent substrate 2, respectively.

As shown in FIG. 3, on the internal surface of the first transparent substrate 1 are formed a plurality of stripe electrodes 6a and a special pattern electrode 6b formed in a particular design. The electrodes 6a and 6b are connected to each terminal 8 formed at one end of the first transparent substrate 1. The transparent electrodes 6a, 6b are composed of ITO (indium-tin-oxide) films or the like.

As shown in FIG. 4, a plurality of stripe electrodes 7a, a plurality of special pattern electrodes 7b connected to the stripe electrodes 7a, and special pattern electrodes 7g (fourth electrodes) independent of the stripe electrodes 7a are formed in the liquid-crystal-encapsulated region 40 defined by the sealing agent 3 on the internal facing surface of the second transparent substrate 2. The stripe electrodes 7a and the special pattern electrodes 7b and 7g among the above electrodes are connected to terminals 11 formed at the IC-mounting position 9. Interconnections from the input terminals 12 to the IC-mounting position 9 are formed on the lower-end portion of the second transparent substrate 2. In addition, electrodes 21 connected to the terminals for the IC are formed at predetermined intervals on the second transparent substrate 2.

Figure 5:
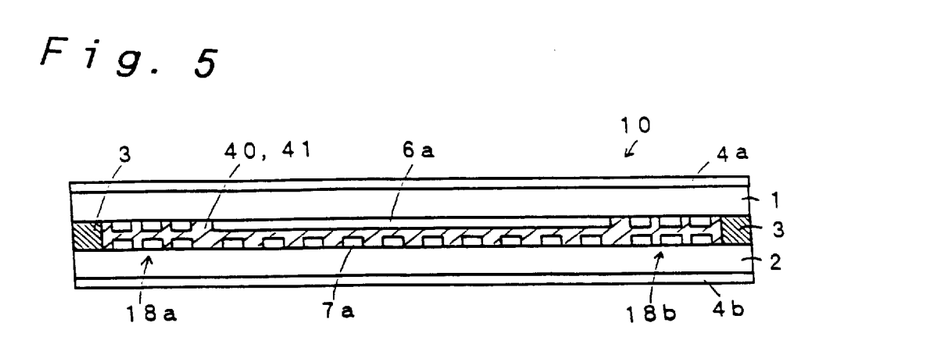
FIG. 5 is a cross section obtained when the liquid-crystal display panel shown in FIG. 1 is cut along line A—A'.

When the first transparent substrate 1 and the second transparent substrate 2 are bonded as shown in FIGS. 1 and 5, the stripe electrodes 6a on the first transparent substrate 1 and the stripe electrodes 7a on the second transparent substrate 2 intersect, forming one pixel at each intersection. The special pattern 6b on the first transparent substrate 1 and the special pattern electrodes 7b and 7g on the second transparent substrate 2 overlap mutually to form each special pattern.

Figure 6:
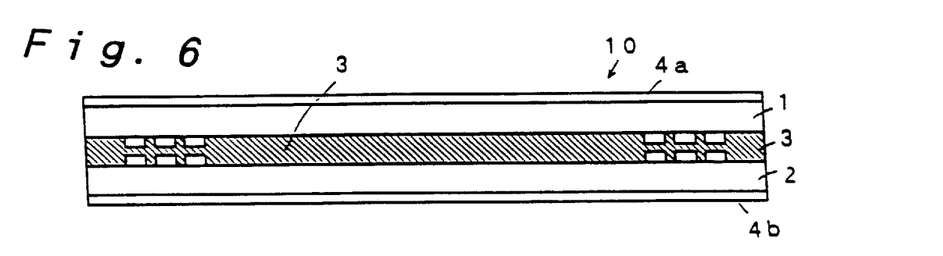
FIG. 6 is a cross section obtained when the liquid-crystal display panel shown in FIG. 1 is cut along line B—B'.
Figure 7:
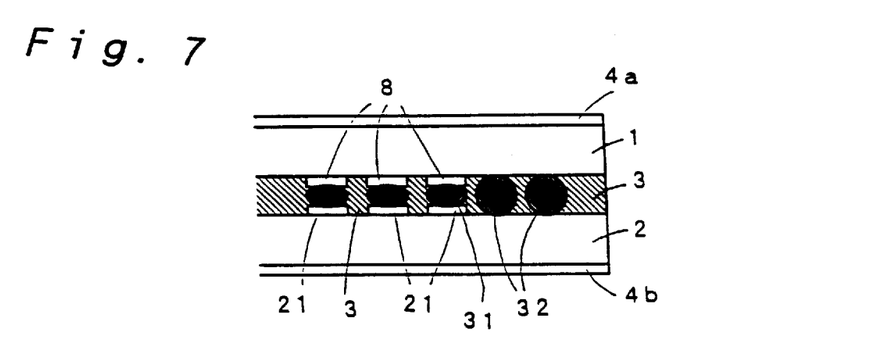
FIG. 7 is an enlarged cross section of a region coated with a sealing agent for the liquid-crystal display panel shown in FIG. 1.

Additionally, electrodes 8 on the first transparent substrate 1 and the electrodes 21 on the second transparent substrate 21 are opposed, shown schematically in FIG. 6, with the first transparent substrate 1 and the second transparent substrate 2 being bonded. Accordingly, by applying the sealing agent 3 including gap materials and conductive particles to a region denoted by an alternate-long-and-short dash line, on the internal surface of the first transparent substrate 1 shown in FIG. 3, or a region denoted by an alternate-long-and-short dash line, on the surface of the second transparent substrate 2 shown in FIG. 4, and by putting together the first transparent substrate 1 and the second transparent substrate 2, the terminals 8 on the first transparent substrate 1 and the electrodes 21 on the second transparent substrate 2 can be in conduction via conductive particles 31 included in the sealing agent 3, as shown by the enlarged view in FIG. 7. The conductive particles 31 are elastically deformable plastic beads whose surfaces are plated. The diameter of each particle is approximately 6.6 $\mu$m, while the diameter of each gap material 32 is approximately 5.6 $\mu$m. Thus, when the sealing agent 3 is hardened with the first transparent substrate 1 being put on the second transparent substrate 2 and force exerted for narrowing their gap, the conductive particles 31 cause the terminals 8 on the first transparent substrate 1 and the electrodes 21 on the second transparent substrate 2 to be in conduction, the result of the particles being squashed between the first transparent substrate 1 and the second transparent substrate 2. In this manner the gap between the first transparent substrate 1 and the second transparent substrate 2 is defined by the gap materials 32.

In the region 40 bounded by the first transparent substrate 1, the second transparent substrate 2, and the sealing agent 3, the liquid crystal 41 is encapsulated. Accordingly, when power and a driving signal for driving the liquid crystal are sent to the input terminals 12 and the liquid-crystal-driving IC 13 through the heat seal, the liquid-crystal-driving IC 13 controls the orientation condition of the liquid crystal 41 so that a desired image is displayed on the liquid-crystal display panel 10 when voltages are applied to the stripe electrodes 6a, 7a, or the special pattern electrodes 6b, 7b and 7g, which are desired, based on the sent driving signal.

In order for a normal image to be displayed on the liquid-crystal display panel 10 having the above structure, it is necessary that all the electrodes not be short-circuited, without distinction of the stripe electrodes 6a and 7a or the special pattern electrodes 6b, 7b and 7g. According to the embodiment, in order to inspect the electrodes for short-circuiting, the electrode-interconnection pattern of the liquid-crystal display panel 10 has the following structure. In the following description it is assumed that inspections are performed for the transparent electrodes formed on the second transparent substrate 2.

Initially, shown in FIG. 4, within the liquid-crystal-encapsulated region 40, a first inspection region 14a is formed so as to perpendicularly intersect the stripe electrodes 7a, and separately therefrom, a second inspection region 14b is formed in a position outside the liquid-crystal-encapsulated region 40. The first inspection region 14a corresponds to a movement region obtained when the two inspection probes 16, arranged at a first inspection interval D1 (inspection interval characteristic of the first inspection region 14a), are moved to scan the transparent substrate 2. The second inspection region 14b corresponds to a movement region obtained when the two inspection probes 17, arranged at a second inspection interval D2 (inspection interval characteristic of the first inspection region 14b), are moved to scan the substrate 2. The inspection probes 16, 17 are obliquely disposed, and the inspection intervals D1 and D2 in this arrangement correspond to the amount of the inspection-probe shifting in the direction intersecting the electrodes.

The inspection probes 16 and 17, which have a tip contact portion having an area less than or equal to that of the electrode to be inspected, are connected to an inspection circuit (not shown). The tip contact portions of the inspection probes touch the electrodes to be inspected, and transmit the condition of the electrodes, for example, the condition of whether or not short-circuiting occurs in the form of an electric signal to an inspection circuit. The inspection circuit is capable of detecting whether or not short-circuiting occurs between at least one pair of inspection probes, in other words, whether or not a current not less than a predetermined amount flows. Since this type of electric circuit has been widely known and its structure may be variously formed, detailed description thereof will be omitted.

In the first inspection region 14a, most of the stripe electrodes 7f (first electrodes) belonging to the stripe electrode 7a are arranged at intervals equal to the inspection interval D1 or the pitch of the inspection probe 16. Thus, by sequentially placing the two inspection probes 16 on the respective stripe electrodes 7f, all the stripe electrodes 7f can be inspected for short-circuiting, base on whether or not the adjacent inspection probes 16 are in conduction.

However, the three stripe electrodes 7c, 7d and 7e (second electrodes) on the left of the drawing are arranged at intervals D3, which each differ from the first inspection interval D1. For example, each interval of the stripe electrodes 7f is 0.15 mm to 0.36 mm, while each interval of the stripe electrodes 7c, 7d and 7e is relatively greater. Accordingly, in this embodiment, interconnection patterns 18a extend from the stripe electrodes 7c, 7d and 7e, and first inspection electrodes 19a are formed at the heads of the interconnection patterns 18a. Each interval of the interconnection patterns 18a is, for example, 0.1 mm to 0.12 mm. Each interval of the first inspection electrodes 19a is, for example, 0.18 mm to 0.34 mm. The first inspection electrodes 19a are arranged at the second inspection intervals D2 of the inspection probes 17 in the second inspection region 14b different from the first inspection region 14a. In the second inspection region 14b, the electrodes 21 electrically connected to the IC terminals 11 are arranged at the second inspection intervals D2 of the inspection probes 17, and part of the electrodes 21 is used as inspection electrodes. Moreover, in the second inspection region 14b, the first inspection electrodes 19a and the electrodes 21 are arranged in parallel at identical intervals (second inspection interval D2 of the inspection probes 17, identical pitch). Therefore, by sequentially putting the inspection probes 17 having the second inspection interval D2 on the respective first inspection electrodes 19a and the respective electrodes 21, all the first inspection electrodes 19a and the electrodes 21 can be inspected as to whether or not short-circuiting occurs, based on whether or not the adjacent inspection probes 17 are in conduction. In other words, while the electrodes 21 are being inspected for short-circuiting, the stripe electrodes 7c, 7d and 7e can be simultaneously inspected for short-circuiting. This provides advantages in which the inspection process can be simplified and an inspection region for inspecting the stripe electrodes 7c, 7d and 7e for short-circuiting does not need to be separately reserved.

Also, the interconnection patterns 18b also extends from the special pattern electrode 7g, and second inspection electrodes 19b is formed at the heads of the interconnection patterns. In the second inspection region 14b, the second inspection electrodes 19b are also arranged at the second inspection intervals D2 in parallel to the first inspection electrodes 19a and the electrodes 21. Accordingly, by sequentially placing the inspection probes 17 having the second inspection interval D2 on the respective first inspection electrodes 19a, the second inspection electrodes 19b, the electrodes 21, the stripe electrodes 7c, 7d and 7e, as well as the special pattern electrode 7g, can all be inspected as to whether or not short-circuiting occurs. This provides advantages in which the inspection process can be simplified and an inspection region for inspecting the special pattern electrode 7g for short-circuiting does not need to be separately reserved.

This type of inspection can be performed efficiently after forming the different types of electrodes on a large glass substrate used to provide a large number of second transparent substrates 2, and before cutting out the second transparent electrodes 2. In addition, if the second transparent substrate 2 has a defect such as short-circuiting, the short-circuited portion can be repaired using a laser beam repair technique. The following describes the inspection method for a case in which inspection is automatically performed on the second transparent substrate 2 cut out from the large glass substrate.

First, the second transparent substrate 2 to be inspected is set at a predetermined position on an inspection stage provided with the inspection probes 16 and 17. The inspection probes 16 and 17 are positioned at ends of the respective inspection regions 14a and 14b on the second transparent substrate 2, and the inspection probes 16 and 17 are subsequently moved with respect to the second transparent substrate 2. Alternatively, the second transparent substrate 2 is moved with respect to the inspection probes 16 and 17. As a result, the inspection probes 16 and 17 scan the inspection regions 14a and 14b on the surface of the second transparent substrate 2.

If short-circuiting occurs between any adjacent electrodes of the stripe electrodes 7f during the scanning, the short-circuiting is detected when the inspection probes 16 moving in the first inspection region 14a reach the electrodes causing the short-circuiting. Also, if short-circuiting occurs among the electrodes 21 connected to the IC terminals 11, the short-circuiting is detected when the inspection probes 17 moving in the second inspection region 14b reach the electrodes causing the short-circuiting.

If the inspection probes 16 move to the left-end stripe electrodes 7c, 7d and 7e in the first inspection region 14a, the inspection probes 16 cannot inspect the electrodes. This is because the inspection interval D1 of the inspection probes 16 and the interval (pitch) of the stripe electrodes 7c, 7d and 7e differ. Similarly, the special pattern electrodes 7g cannot be inspected because the inspection interval D1 of the inspection probes 16 and the interval (pitch) of the interconnection pattern 18b differ. In this embodiment the stripe electrodes 7c, 7d and 7e and the first and second inspection electrodes 19a and 19b connected to the special pattern electrodes 7g extend to the second inspection region 14b, and the interval of the first or second inspection electrode 19a or 19b coincides with the inspection interval characteristic of the second inspection region 14b, namely, the inspection interval D2 of the second inspection probes 17. Therefore, inspections of the stripe electrodes 7c, 7d and 7e, and inspections of the special pattern electrodes 7g cannot be directly performed by the first inspection probes 16 but can be performed by the second inspection probes 17. Consequently, according to the liquid-crystal display panel 10 and the method for inspecting the liquid-crystal display panel 10 of the present invention, even if electrodes to be inspected include different-pitch electrodes, the electrodes can be automatically inspected without difficulty by using multi-purpose inspection probes arranged at a constant interval because inspection electrodes arranged at predetermined intervals are electrically connected in parallel to the electrodes to be inspected.

Additionally, the interconnection pattern 18*a* for electrically connecting the stripe electrodes 7*c*, 7*d* and 7*e* and the inspection electrodes 19*a* does not contribute to a display operation after the production of the liquid-crystal display panel 10 is completed. Accordingly, the interconnection pattern 18*a* is formed on a outer portion of the substrate within the region for forming the sealing agent 3, with intervals narrower than either the intervals D2 or D3 and each line width narrower than that of the stripe electrode 7*c*, 7*d* or 7*e*. Thus, the region occupied by the interconnection pattern 18*a* is narrowed as much as possible, and the formation of the stripe electrodes 7*a* contributing to the display operation is not hindered. If the area occupied by the interconnection pattern 18*a* is narrowed, a region in which the sealing agent 3 is provided is reserved on the periphery of the interconnection pattern 18*a*. Thus, sealing agent 3 is one which includes conductive particles 31 for electrically connecting the terminals on the first transparent substrate 1 and the electrodes 21 on the second transparent substrate 2. In other words, when the sealing agent 3 having the conductive particles 31 is used, it is preferable not to form an interconnection pattern on the region in which the sealing agent 3 is provided, thereby avoiding unnecessary electrical connection between the first transparent substrate 1 and the second transparent substrate 2. In this embodiment, since the area occupied by the interconnection pattern 18*a* is narrowed, the region in which the interconnection pattern 18*a* is formed is avoided by the sealing agent 3, and on a substrate portion outer therefrom, the region in which the sealing agent 3 is formed can be reserved. By forming the sealing agent 3 on the outer substrate portion, the need for forming the interconnection pattern 18*a* in the region in which the sealing agent 3 is formed is eliminated, or part of the interconnection pattern 18*a* passing through the region in which the sealing agent 3 is provided can be reduced to its necessary minimum.

Figure 8:
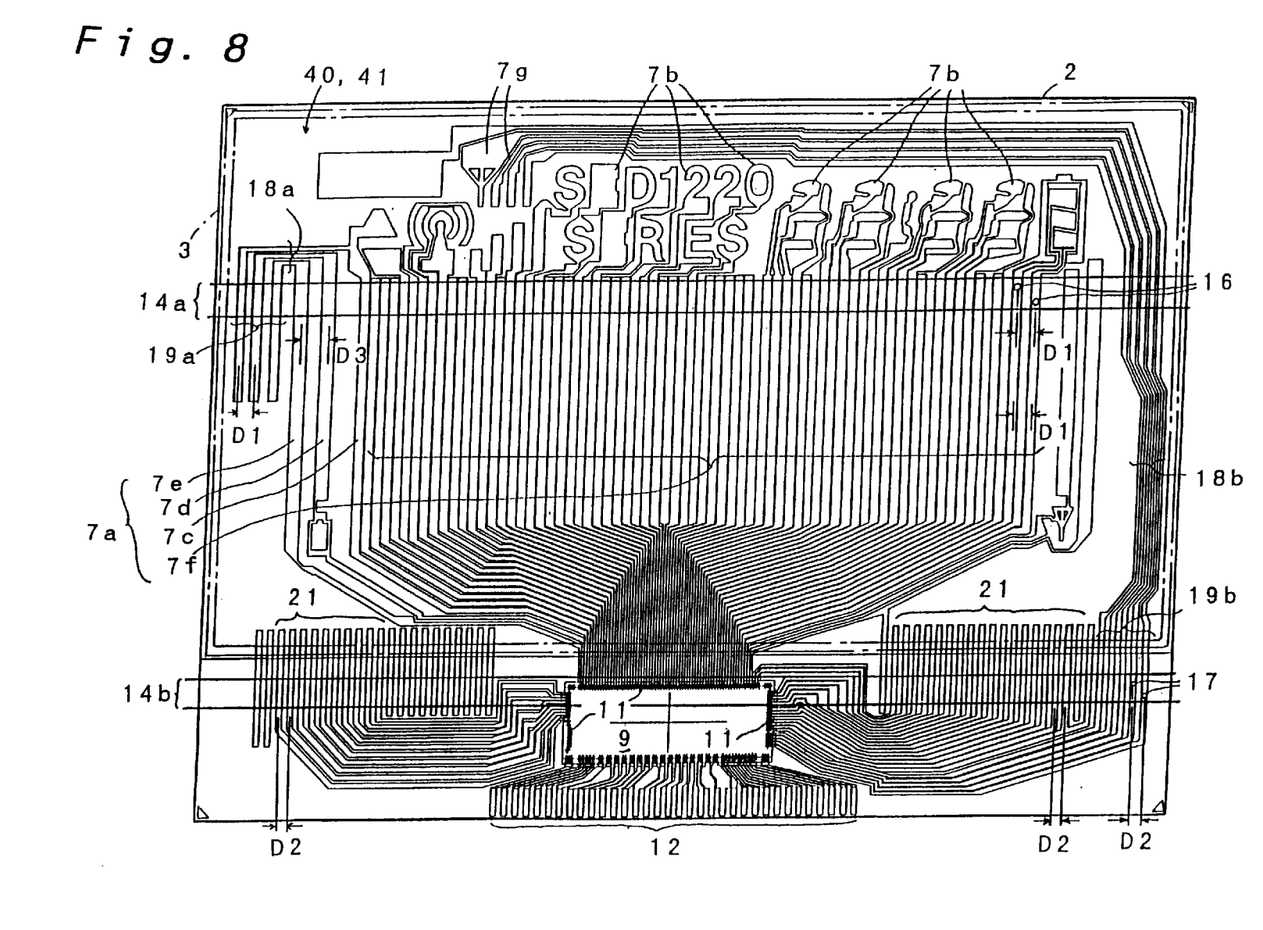
FIG. 8 is a plan view of a transparent substrate used in a liquid-crystal display panel according to another embodiment of the present invention.

FIG. 8 is a plan view showing a second transparent substrate used in a liquid-crystal display panel according to a second embodiment of the present invention. Since the second transparent substrate shown in FIG. 8 has the same structure as the second transparent substrate shown in FIG. 4, common portions are denoted by identical reference numerals, and detailed descriptions thereof will be omitted.

In this embodiment, the first inspection electrodes 19*a* are formed parallel to the electrodes 21 in the second inspection region 14*b*. However, as shown in FIG. 8, first inspection electrodes 19*a* electrically connected to stripe electrodes 7*c*, 7*d* and 7*e* (second electrodes) may be formed in parallel to stripe electrodes 7*f* (first electrodes) in a first inspection region 14*a*. In this case the interval of the first inspection electrodes 19*a* and the interval of the stripe electrodes 7*f* are formed to be equal. In other words, the interval of the first inspection probe 19*a* is also formed to be equal to the first inspection interval D1 of the inspection probes 16. This structure enables inspections of the stripe electrodes 7*c*, 7*d* and 7*e* when the stripe electrodes 7*f* are inspected for short-circuiting in the first inspection region 14*a*. Thus, it is not necessary to separately form a region for inspecting the stripe electrodes 7*c*, 7*d* and 7*e* on the transparent substrate and to carry out only inspections of the stripe electrodes 7*c*, 7*d* and 7*e*. In other words, only one region for inspecting all the stripe electrode 7*a* is required.

The present invention has been described with reference to the preferred embodiments thereof. However, the present invention is not limited to the preferred embodiments but may be variously modified within the technical scope set forth in the appended claims.

For example, in the embodiment shown in FIG. 4, the two sets of inspection probes 16 and 17 are used for one inspection region 14*a* or 14*b*. Instead, by arranging a number of sets of inspection probes at the regular intervals D2 and D2 along the inspection regions 14*a* and 14*b*, a number of electrodes can be simultaneously inspected.

Additionally, the foregoing embodiments are cases where the present invention is applied to a so-called COG (chip-on-glass) type liquid-crystal display panel in which the liquid-crystal driving IC 13 is directly mounted on the second transparent substrate 2. The present invention is also capable of being applied to various other types of liquid-crystal display panels.

The foregoing descriptions also show a case in which the inspection electrodes 19*a* and 19*b* are provided for the stripe electrodes 7*c*, 7*d* and 7*e* and the special pattern electrode 7*g* which are formed on the second transparent substrate 2. Alternatively, the present invention may be applied to the electrodes formed on the first transparent substrate 1, shown in FIG. 3.

What is claimed is:

1. A liquid-crystal display panel comprising first and second opposing transparent substrates separated by a gap, a sealing agent for defining a liquid-crystal-encapsulated region in the gap between said first and second transparent substrates, and liquid crystal encapsulated in said liquid-crystal-encapsulated region, wherein at least one of said first and second transparent substrates further comprises a plurality of first electrodes arranged in parallel and spaced apart at a first inspection interval, a first inspection region intersecting said first electrodes, a plurality of second electrodes arranged in parallel to said first electrodes and spaced apart at a second interval, a plurality of first inspection electrodes extending from each of said second electrodes, and wherein said first inspection electrodes are parallel and spaced apart at said first inspection interval.

2. A liquid-crystal display panel according to claim 1, wherein said first electrodes and said second electrodes are in said liquid-crystal-encapsulated region.

3. A liquid-crystal display panel according to claim 2, wherein said liquid-crystal display panel further comprises a plurality of third electrodes, said third electrodes being parallel and spaced apart by a second inspection interval, said third electrodes located outside said liquid-crystal-encapsulated region, and a second inspection region intersecting said third electrodes, and wherein said first inspection electrodes are spaced apart at said second inspection interval in parallel to said third electrodes in said second inspection region.

4. A liquid-crystal display panel according to claim 3, wherein said second electrodes and said first inspection electrodes are electrically connected by an interconnection pattern formed on a peripheral portion of said substrate at intervals less than said second electrode spacing, said first inspection electrodes having a line width less than said second electrode width.

5. A liquid-crystal display panel according to claim 4, wherein said sealing agent further comprises conductive particles for electrically connecting said first electrodes on said first transparent substrate and said first electrodes on said second transparent substrate, and is formed on a substrate portion outer than said interconnection pattern.

6. A liquid-crystal display panel according to claim 3, wherein one of said first and second transparent substrates further comprises a plurality of fourth electrodes outside said inspection region within said liquid-crystal-encapsulated region, and second inspection electrodes spaced at said second inspection intervals and extending from said fourth electrodes, said second inspection electrodes parallel to said third electrodes within said second inspection region.

7. A liquid-crystal display panel according to claim 1, wherein said first inspection electrodes are parallel and spaced at said first inspection interval and are parallel to said first electrodes within said first inspection region.

8. A liquid-crystal display panel according to claims 1, further comprising a plurality of inspection probe pairs, said plurality of inspection probe pairs forming inspection probe sets, wherein a first set of inspection probes are spaced apart by said first inspection interval, said inspection probe pairs touching each pair of said first electrodes to be inspected so as to inspect each pair of adjacent electrodes for conduction.

9. A method for inspecting the liquid-crystal display panel defined in claim 8, wherein one of inspection probe sets and said first transparent substrate to be inspected by said inspection probe set are relatively moved so that in said first inspection region said inspection probe set scans said first electrodes, and said inspection probe pairs sequentially touching each pair of adjacent electrodes among said first electrodes, said pair of adjacent electrodes are inspected as to whether or not short-circuiting occurs, based on whether or not said adjacent inspection probe pair are in conduction.

* * * * *